United States Patent [19]

Meinholdt

[11] 3,825,282
[45] July 23, 1974

[54] SWAY CONTROL FOR TRAILERS

[76] Inventor: John W. Meinholdt, 1900 Central, Topeka, Kans. 66608

[22] Filed: Jan. 2, 1973

[21] Appl. No.: 320,284

[52] U.S. Cl............................................ 280/446 B
[51] Int. Cl............................................. B60d 1/00
[58] Field of Search .......... 280/446; 188/72.9, 72.6, 188/122

[56] References Cited
UNITED STATES PATENTS

| | | | |
|---|---|---|---|
| 3,273,911 | 9/1966 | Waldie | 280/446 B |
| 3,294,421 | 12/1966 | Mathisen | 280/446 R |
| 3,635,496 | 1/1972 | Hedgepeth | 280/446 B |

FOREIGN PATENTS OR APPLICATIONS

| | | | |
|---|---|---|---|
| 695,898 | 8/1940 | Germany | 280/446 B |
| 840,845 | 7/1960 | Great Britain | 280/446 B |

*Primary Examiner*—Leo Friaglia
*Assistant Examiner*—Randall A. Schrecengost
*Attorney, Agent, or Firm*—Fishburn, Gold & Litman

[57] ABSTRACT

A sway control device for trailers and the like comprising a brake member secured to a portion of the trailer and having means for selectively activating brake shoes thereon. A link is universally mounted on and extends between the brake shoe member and the towing vehicle and is operable to activate a brake arm member frictionally engaging the brake shoes for resisting turning and swaying of the trailer in response to turning of the towing vehicle and/or wind gusts striking the trailer.

4 Claims, 6 Drawing Figures

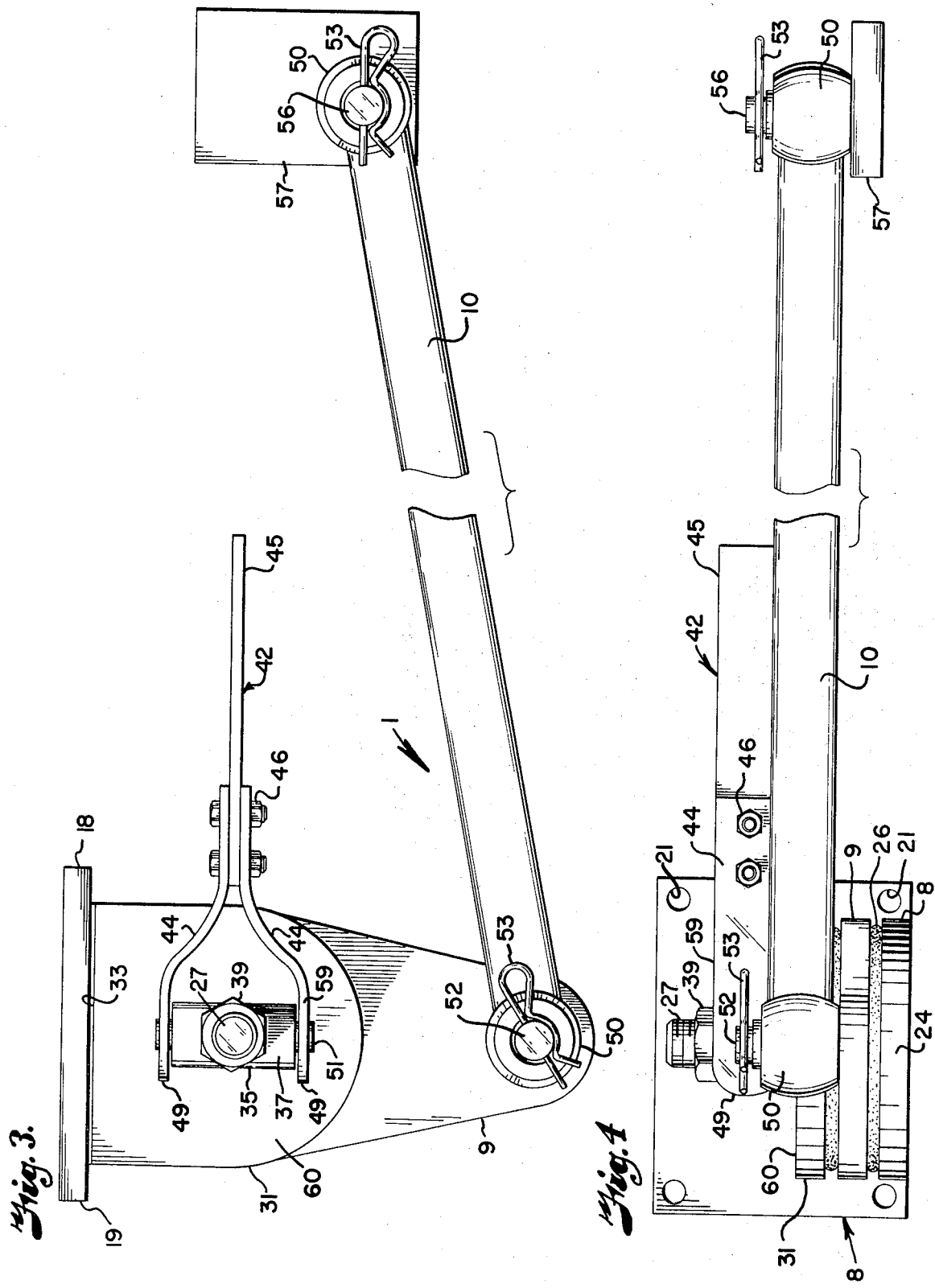

SWAY CONTROL FOR TRAILERS

The principal objects of the present invention are: to provide a sway control device for trailers and the like having a link connecting the towing vehicle to a brake member; to provide such a sway control device wherein both ends of the link have universal mounting means for allowing unrestrained relative movement therebetween; to provide such a sway control device with brake shoe pads that are not permanently secured to portions of the brake shoe member for ease in construction and maintenance of the sway control device; to provide such a sway control device with operative means for selectively urging the brake shoe pads into engagement with a brake arm, that can be locked in a brake engaged or a non-engaged position; to provide such a sway control device that has means for adjusting the amount of frictional force applied by the brake shoe pads to the brake arm; and to provide a sway control device that is easy and economical to manufacture, that has a minimum number of parts and is compact, positive in operation, safe and easy to use and attractive in appearance.

Other objects and advantages of the present invention will become apparent from the following description taken in connection with the accompanying drawings wherein are set forth by way of illustration and example certain embodiments of this invention.

FIG. 3 is a plan view of the sway control device.

FIG. 4 is a side elevational view of the sway control device.

Figure 1:
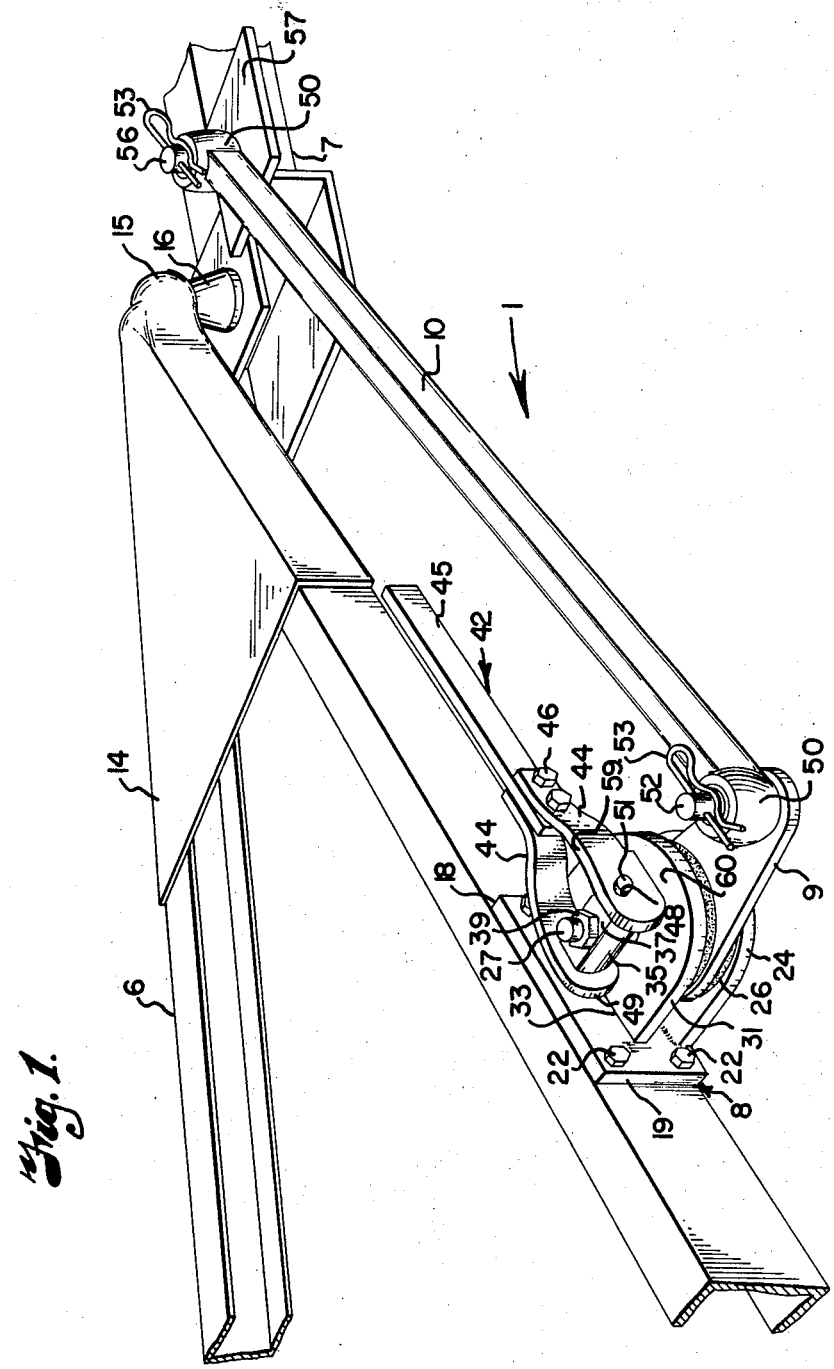
FIG. 1 is a perspective view of a sway control device secured to and connecting a trailer and a towing vehicle.
Figure 2:
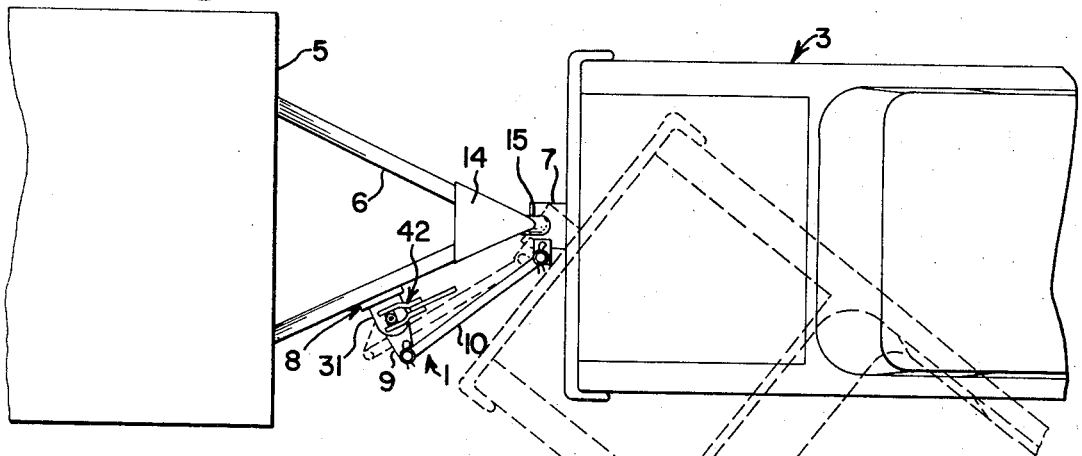
FIG. 2 is a plan view of a sway control device and a trailer and the towing vehicle.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

A sway control device designated generally by the reference numeral 1 is connected between a towing vehicle 3 and a towed vehicle 5 such as a trailer and is operable for increasing the resistance to relative movement between the vehicles 3 and 5. In the illustrated structure there is a tongue member 6 secured to and extending from the trailer 5 and is pivotally mounted on a trailer hitch member 7 that is suitably secured to the towing vehicle 3. The sway control device 1 has portions suitably secured to the tongue member 6 and the trailer hitch member 7 and is operable to resist relative movement between the towing vehicle 3 and the trailer 5 by frictional engagement between portions of the sway control device 1.

The sway control device 1 as illustrated includes a brake member 8 that preferably is secured to the tongue member 6 of the trailer 5 and includes an arm 9 that is in frictional engagement with portions of the brake member 8. A link 10 has one end universally mounted on the arm 9 and the other end universally mounted on the trailer hitch member 7, the other end being spaced from the pivot point of the tongue member 6 and the trailer hitch member 7. The link 10 is operable to transmit the relative movement between the towing vehicle 3 and the trailer 5 to the arm 9 urging the arm 9 to move during the relative movement whereby the frictional engagement between the arm 9 and the brake member 6 dampens or resists the relative movement between the towing vehicle 3 and the trailer 5.

The tongue member 6 is of generally standard construction and in the illustrated structure is V-shaped and converges away from the trailer 5 to a plate member 14 that has a socket forming portion 15 at the end thereof. The towing vehicle 3 has the trailer hitch member 7 also of generally standard construction suitably secured to the rear end thereof and has an upstanding ball member 16 suitably secured thereto. The ball member 16 is contained in the socket forming portion 15 for pivotally securing the trailer 5 to the towing vehicle 3.

As illustrated, the brake member 8 includes a bracket 18 that is secured to the tongue member 6 in any suitable manner such as by welding and in the form illustrated, the bracket 18 has a flange portion 19 that is secured to the tongue member 6 as by having a plurality of apertures 21 therethrough for receiving securing devices 22 such as screws or rivets to secure the bracket 18 to the tongue member 6. It is to be noted that the brake member 8 can be secured to either the towing vehicle 3 or the trailer 5, but preferably is secured to the trailer 5. The bracket 18 has a second flange portion 24 extending outwardly from the flange portion 19. Friction pads 26 are suitably mounted on the flange portion 24 and are in engagement with the arm 9 that is also suitably mounted on the flange portion 24. In the illustrated structure, the flange portion 24 has secured thereto, in any suitable manner, an upstanding stud member 27. Although only one friction pad 26 is necessary, preferably there are two friction pads 26 each having an aperture 28 therethrough for receiving the stud member 27 thereby mounting the friction pads 26 on the bracket 18. The arm 9 has an aperture 29 therethrough receiving the stud member 27 thereby pivotally mounting the arm 9 on the bracket 18, preferably having one friction pad 26 positioned on each side of the arm 9. Clamping means of any suitable type are mounted on the stud 27 and are operable to selectively urge the arm 9 and friction pad 26 into frictional engagement. In the illustrated structure, the clamping means includes a clamp or cover plate 31 suitably mounted on the bracket 18 and in frictional engagement with the uppermost disposed friction pad 26. Preferably, the clamp plate 31 has a through aperture 32 that receives the stud 27 for mounting the clamp plate 31 on the bracket 18. The clamp plate 31 is shaped so as to prevent rotation thereof about the stud 27 and as illustrated, the clamp plate 31 has a straight edge portion 33 adjacent to the flange portion 19 that will engage same thereby preventing the clamp plate 31 from rotating about the stud 27.

Any suitable device can be mounted on the brake member 8 for urging and locking the brake pads 26 and the arm 9 in frictional engagement and in the illustrated structure, a support member 35 having a through aperture 36 receives the stud 27 therethrough for mounting the support member 35 on the bracket 18 in overlying relation to the clamp plate 31. Preferably, the support member 35 has a flat surface portion 37 generally normal to the axis of the aperture 36 and facing generally upward. A securing device 39, such as a nut, suitably engages the stud 27 thereby securing the support member 35, the clamp plate 31, the arm 9 and the friction pads 26 to the bracket 18. The securing device 39 is adequate by itself to maintain frictional engagement between the friction pads 26 and the arm 9, but it is desirable to have a device that will selectively permit one to urge the friction pads 26 and the arm 9 into frictional engagement and to also permit one to release the frictional engagement therebetween. In the form illustrated, an eccentric or cam-type member, designated generally by the numeral 42, is suitably pivotally mounted on the support member 35 and is operable for selectively urging the friction pad 26 into frictional engagement with the arm 9. Preferably, the cam member 42 is of a yoke-type construction having two spaced apart arm members 44 suitably secured to a handle portion 45, wherein the handle portion 45 is between the arm members 44 and is secured therebetween by securing devices 46 such as bolts and nuts. Each arm member 44 has an aperture 48 therethrough adjacent to respective free ends 49 thereof. The support member 35 has a protruberance 51 extending from each end thereof that are each received through a respective aperture 48 thereby pivotally mounting the cam member 42 on the support member 35. The free ends 49 are preferably rounded or arcuate thereby allowing easy pivotal movement of the cam member 42 against the clamp plate 31. It is to be noted that the brake member 8 would be an operable structure in the absence of the clamp plate 31 and the uppermost disposed friction pad 26 and having the cam member 42 engaging the arm 9. The innermost disposed arm 44 adjacent the flange 19 is positioned near enough thereto for preventing the cam member 42 and the support member 35 from rotating or pivoting about the stud 27.

The link 10 is an elongate member that is suitably universally mounted on the arm 9 and trailer hitch member 7 and is operable to pivot the arm 9 about the stud 27 in response to relative movement between the towing vehicle 3 and the trailer 5 to allow the relative movement without binding. As illustrated, the link 10 has universal or self-aligning bearing members 50 appropriately secured to each end thereof. spherical bearings or ball joints that permit universal movement of the link 10 when mounted. Any suitable mounting means for the link 10 is appropriate, and in the illustrated structure the arm 9 has a portion thereof extending outwardly of the brake member 8 and has an upstanding pin or stud 52 suitably secured thereto such as by welding. The bearing members 50 each have a bore therethrough, one of which receives the upstanding pin 52 thereby mounting one end of the link 10 on the arm 9. Any suitable securing device 53 such as a spring keeper or cotter pin extends through an aperture through the pin 52 for preventing the pin 52 from becoming accidentally disconnected from the arm 9. An upstanding pin or stud 56 is suitably secured to the trailer hitch member 7 and preferably a plate 57 is appropriately secured to the trailer hitch member 7 and has the pin 56 secured thereto wherein the plate 57 allows the pin 56 to be spaced a sufficient distance from the ball member 16 preventing interference with the link 10 and urging movement of the arm 9 during relative movement of the trailer 5 and towing vehicle 3. The pin 56 extends through the bore through the bearing member 50 thereby mounting the link 10 on the trailer hitch member 7. A fastening device 53 such as used on the pin 52 extends through an aperture through the pin 56 thereby securing the link 10 to the trailer hitch member 7 preventing accidental disconnection thereof.

Figure 5:
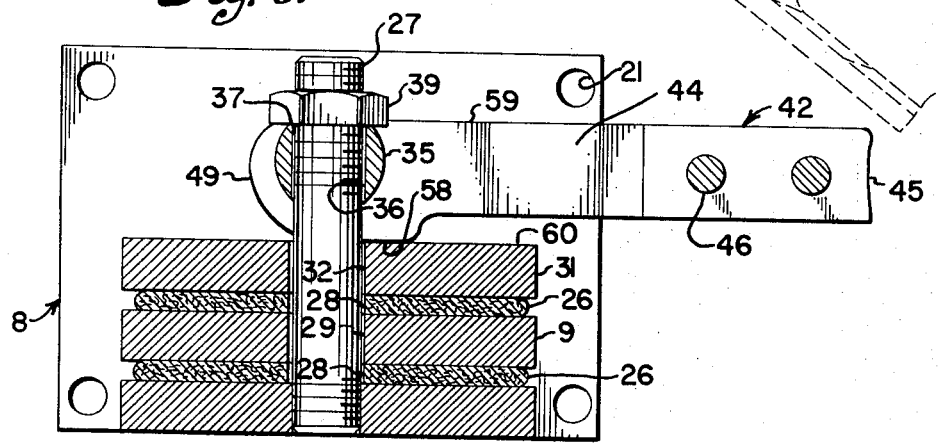
FIG. 5 is an enlarged view of a brake member of the sway control device with sections broken away to show structural details and with the brake shoes in an activated position.
Figure 6:
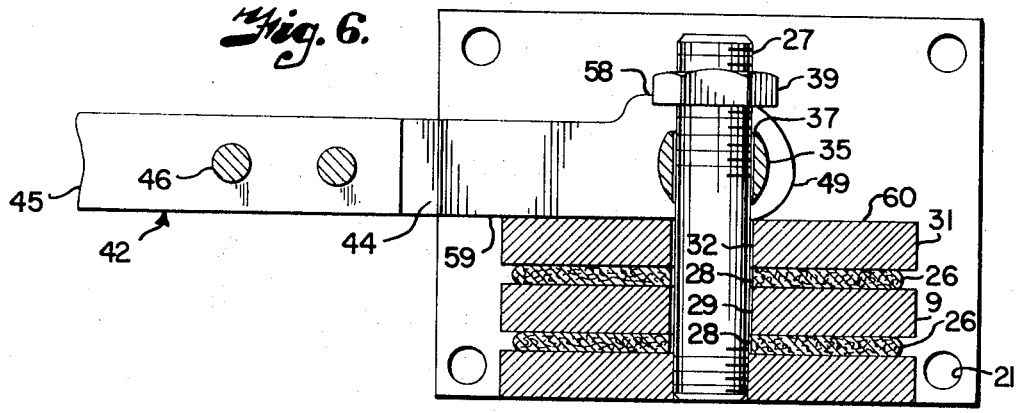
FIG. 6 is an enlarged side elevational view of the brake member with sections broken away to show structural details with the brake shoes in a non-activated position.

The present invention is more fully understood by a description of the operation thereof. When a trailer 5 is being towed by a vehicle 3, it has a tendency to sway or pivot about the trailer hitch member 7 due to wind gusts and/or braking with the attendant dangers therefrom such as jackknifing. When there is relative pivoting between the towing vehicle 3 and the trailer 5 about the trailer hitch member 7, the link 10 urges the arm 9 to pivot about the stud 27 and the frictional engagement between the arm 9 and the friction pads 26 aids in dampening or resisting the relative pivotal movement between the trailer 5 and the vehicle 3 helping to stabilize same. When the arm 9 is pivoting about the stud 27 the clamp plate 31 has a tendency to also pivot about the stud 27 whereby the straight edge portion 33 engages the flange 19 preventing rotation thereof. The cam member 42 selectively urges and locks the friction pads 26 into engagement with the arm 9, the flange 24 and the clamp plate 31. FIG. 5 illustrates the cam member 42 in a braking position and FIG. 6 illustrates the cam member 42 in a non-braking position. The arms 44 each have opposed edges 58 and 59 that are substantially flat or straight with the edge 58 spaced further from the protruberance 51 than the edge 59. With the cam member 42 in the braking position, the edge 58 engages a surface 60 of the clamp plate 31 urging frictional engagement between the friction pads 26 and the arm 9. With the cam member 42 in the non-braking position, the edge 59 engages the surface 60 and being spaced closer to the protruberance 51 allows the frictional engagement between the friction pads 26 and the arm 9 to be disengaged. It is to be noted that the flat edges 58 and 59 help provide a lock for the cam member 42 to prevent accidental changing of the cam member 42 from a braking position to a non-braking position and vice-versa. The securing device 39 is in threaded engagement with the stud 27 thereby allowing adjustment of the total amount of frictional engagement between the friction pads 26 and the arm 9 when the cam member 42 is in the braking position. Threading the securing device 39 downward on the stud 27 increases the frictional engagement and threading the securing device 39 upwardly on the stud 27 decreases the frictional engagement. Having the clamp plate 31 free to move along the stud 27 permits a simplified structure for adjusting the amount of frictional engagement and for selectively engaging the friction pads 26 with the arm 9. The relative positions between the towing vehicle 3 and the trailer 5 are changed when going over the top of a hill or traveling through a dip or valley in the road or turning corners, and is resisted by the braking action of the brake member 8. The self-aligning bearing members 50 not only allow the towing vehicle 3 and trailer 5 to change positions during swaying or turning, but also allow the towing vehicle 3 and trailer 5 to be in different planes without binding of the link 10 and the sway control device 1.

It is to be understood that while I have illustrated and described certain forms and arrangements of my invention, it is not to be limited to the specific forms illustrated and described.

What I claim and desire to secure by Letters Patent is:

1. A sway control device for a towed vehicle having a tongue member connected to a trailer hitch member that is secured to a towing vehicle comprising:
   a. a brake member secured to one of a tongue member and trailer hitch member and having a flange portion extending outwardly thereof and a brake surface;
   b. a stud fixed to said flange and defining a pivotal axis upstanding from said brake surface;
   c. an arm rotatably mounted on said stud and having a surface faced said flange and an end portion spaced from said stud;
   d. a friction member between said surfaces of said flange and said arm;
   e. a brake actuating lever pivotally mounted on said stud for swinging movement about an axis transversely of said stud and selectively operative to effect relative movement of the arm, friction member and flange from a free rotative relation to a braking frictional engagement therebetween;
   f. a link having opposite ends with one end mounted on said arm end portion remote from said friction member and the other end mounted on the other of said tongue member and trailer hitch member in spaced relation to the connection of same.

2. A sway control device as set forth in claim 1 including:
   a. a support member sleeved on said stud and spaced from said arm;
   b. means adjustable on said stud and adjusting the spacing the support member from the arm;
   c. said braking actuating lever being pivotally mounted on said support member and having a cam member engaging the arm to effect said relative movement and braking engagement.

3. A sway control device as set forth in claim 2 and including:
   a. a clamp plate sleeved on said stud between the cam and said arm, said plate having a surface facing the arm;
   b. a second friction member between the surface of said clamp plate and said arm;
   c. said brake member and flange is secured to the tongue member and the other end of the link is mounted on said trailer hitch member;
   d. said selective braking operation of said lever to move the cam into engagement with the clamp plate and frictional engagement of said clamp plate and arm with said second friction member and the arm and flange into frictional engagement with the first named friction member;
   e. means on said brake member and clamp plate holding said clamp plate against rotation relative said stud.

4. A sway control device as set forth in claim 2 wherein:
   a. said stud has a threaded portion and said means adjustable on the stud is a threaded nut forming an abuttment limiting movement of the support member away from the arm;
   b. said lever is pivoted on the support member for pivotal movement about an axis transversely of the axis of the stud;
   c. said cam has oppositely disposed high and low portions that are flat and selectively engaged relative the arm to remain in brake engaging and brake released position until the lever is manually moved to the other position.

* * * * *